Figure 1:
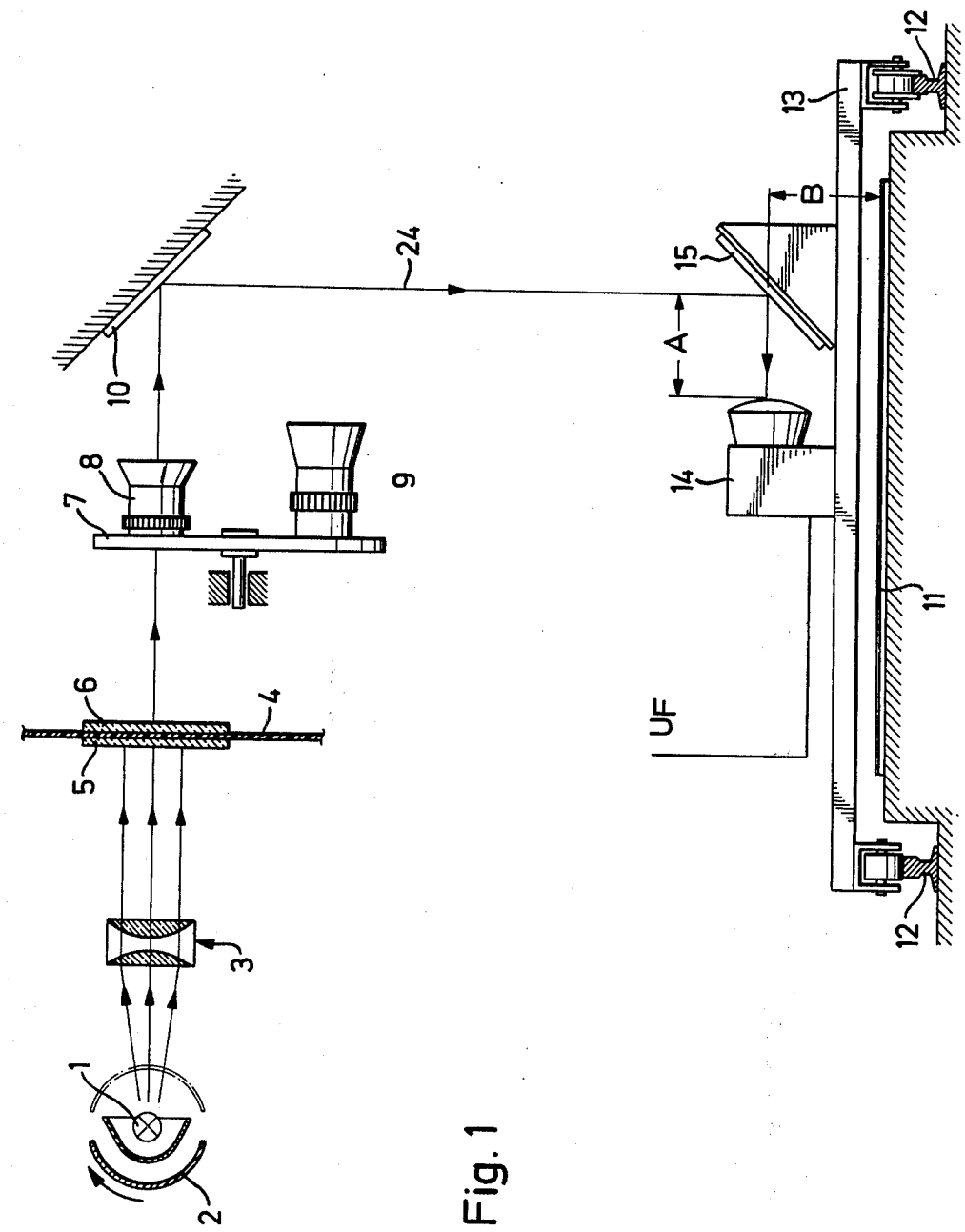

United States Patent [19]

Schroter

[11] 4,018,526

[45] Apr. 19, 1977

[54] METHOD OF AND APPARATUS FOR CONTROLLING THE EXPOSURE TIME IN AN APPARATUS FOR THE RE-ENLARGEMENT OF MICROFILMS

[75] Inventor: Herbert Schroter, Taunusstein, Germany

[73] Assignee: Hoechst Aktiengesellschaft, Germany

[22] Filed: Aug. 12, 1975

[21] Appl. No.: 604,059

[30] Foreign Application Priority Data

Aug. 16, 1974 Germany .......................... 2439308

[52] U.S. Cl. .................................. 355/68; 355/71
[51] Int. Cl.[2] ...................................... G03B 27/78
[58] Field of Search ............................ 355/67–71

[56] References Cited

UNITED STATES PATENTS

| 3,702,732 | 11/1972 | Sliwkowski | 355/68 |
| 3,704,947 | 12/1972 | Reinour | 355/68 |
| 3,728,023 | 4/1973 | Stevko et al. | 355/68 |
| 3,914,049 | 10/1975 | Basu et al. | 355/68 |
| 3,947,112 | 3/1976 | Hahn et al. | 355/70 X |

FOREIGN PATENTS OR APPLICATIONS

| 1,957,752 | 5/1971 | Germany | 335/68 |
| 1,155,482 | 6/1969 | United Kingdom | 355/68 |
| 1,366,162 | 9/1974 | United Kingdom | 355/68 |

*Primary Examiner*—L. T. Hix
*Attorney, Agent, or Firm*—James E. Bryan

[57] ABSTRACT

This invention relates to a method of controlling the exposure time in apparatuses for the re-enlargement of a microfilm in which the density of the microfilm is ascertained during exposure and the exposure time is controlled in accordance with the ascertained density, which comprises guiding a light-sensitive measuring unit, during a minimum exposure time needed and at a short distance above a light-sensitive recording material, and simultaneously measuring the density of the microfilm with the light-sensitive measuring unit, the signals measured by the light-sensitive measuring unit, which correspond to the areas of the microfilm having the maximum or minimum density, determining the exposure time. The invention also relates to an apparatus for performing the method.

6 Claims, 8 Drawing Figures

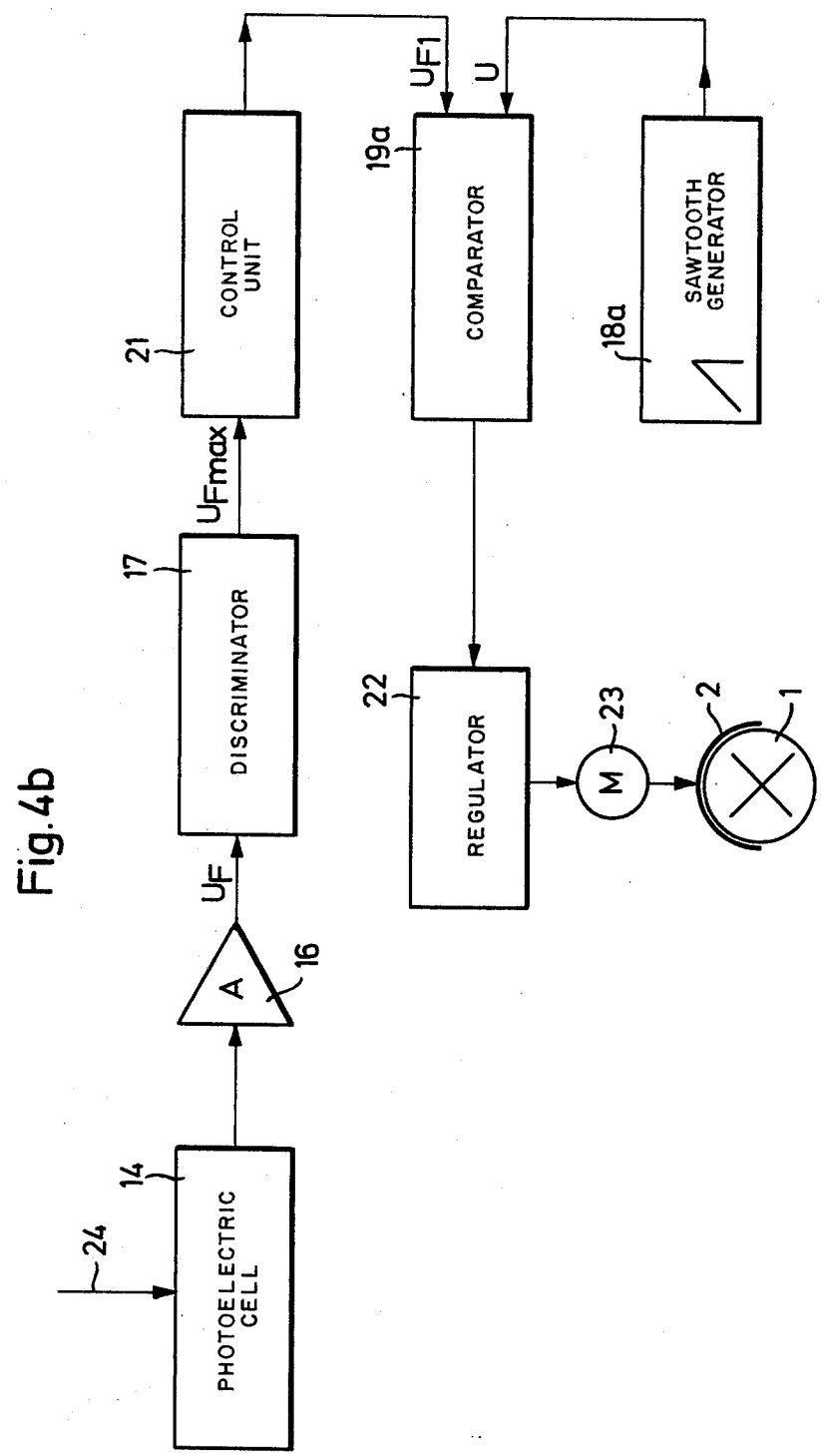

METHOD OF AND APPARATUS FOR CONTROLLING THE EXPOSURE TIME IN AN APPARATUS FOR THE RE-ENLARGEMENT OF MICROFILMS

The present invention relates to a method of and an apparatus for controlling the exposure time in apparatuses for the re-enlargement of microfilms, in which the density of the microfilm is ascertained during exposure and the exposure time is controlled in accordance with the ascertained density.

In order to re-enlarge information on microfilm images, the microfilm image is projected, for example, onto electrically charged zinc oxide paper and then the latent image is made visible by treatment with toner powder.

In most cases, the densities of the microfilms to be enlarged vary very much so that, if all microfilms are exposed in the same manner, the quality of the re-enlargements varies considerably. Therefore automatically operating re-enlargement devices already have been proposed in which the exposure time is controlled. It is also already known from German Offenlegungsschrift No. 1,447,827, to control both the exposure time and the intensity of illumination.

The present invention provides a simple control of the exposure time for apparatuses for the re-enlargement of microfilms, in which the density of the microfilms is measured directly in the ray path, while exposure is occurring.

According to the invention, a method of the type mentioned above is proposed in which the light-sensitive measuring unit is guided, during the minimum exposure time needed and at a short distance above the light-sensitive recording material, at the same time the light-sensitive measuring unit measures the density of the microfilm and the signals measured by the light-sensitive measuring unit, which correspond to the areas of the microfilm having the maximum or minimum density, define the exposure time.

Furthermore, according to the invention, an apparatus for carrying out the method is provided, including a movable measuring unit for ascertaining the density of the microfilm during exposure which is arranged in the ray path between the microfilm and the light-sensitive recording material closely above the level of the light-sensitive recording material, a discriminator which selects the measured signals of the light-sensitive measuring unit which correspond to the maximum or minimum density of the microfilm, and a device which controls the exposure time according to the signal coming from the discriminator.

According to the invention, it is thus possible to measure the density of a microfilm card directly in the ray path. As a consequence, it is possible to use the same system of lenses which produces an image of the microfilm on the light-sensitive recording material for measuring the density and thus defining the exposure time. The fact that the ascertainment of density takes place during exposure has the additional advantage that the operational speed of the apparatus for re-enlargement is not influenced by the ascertainment of the exposure time.

The exposure time may be controlled according to the imaged or non-imaged parts, i.e. the bright or dark spots of the microfilm. If negatives are used, in the first case the one signal is selected from the signals measured by the light-sensitive measuring unit which corresponds to the brightest spot of the microfilm, i.e. the signal having the highest photoelectric voltage. In the second case, the one signal is selected from those measured by the light-sensitive measuring unit which corresponds to the darkest spot of the microfilm, i.e. the signal having the lowest photoelectric voltage. In this case, however, as will be further described hereinafter, the signal is changed, before it is put onto the discriminator, by difference-forming or quotient-forming, in such a manner that in the discriminator again the highest signal is selected, which in this case however, corresponds to the lowest photoelectric voltage. It has been found that a control of the exposure time according to the darkest spots of the microfilm produces more exactly exposed re-enlargements than a control of the exposure time according to the brightest spot of the microfilm. Therefore, the dark spots are preferably used for the controlling.

The light-sensitive measuring unit may have one or more light-sensitive elements, e.g. photoelectric cells, photoresistors and the like. The light-sensitive measuring unit is arranged on a carriage which slides automatically at a short distance over the light-sensitive recording material at the beginning of each exposure time. The light-sensitive element also may be arranged on a carrier which is turned above the light-sensitive recording material. The embodiment including the carriage, which is moved above the entire light-sensitive recording material, is preferred to the one including the swivelling carrier, since in the first case all spots of the light-sensitive recording material are covered by the carriage equally long, whereas in the second case only part of the light-sensitive recording material is covered for a short time and others not at all, a fact which may lead to uneven exposure.

The time needed for the swivelling motion of the carrier or the longitudinal movement of the carriage must not be longer than the minimum exposure time needed for each microfilm. If the exposure time is calculated according to the dark non-imaged parts of the microfilm, the minimum exposure time depends upon the highest densities in the dark non-imaged parts of the microfilms. If the exposure time is calculated according to the bright imaged parts of the microfilm, it depends upon the lowest densities in the bright imaged parts os the microfilms. If a microfilm to be copied has this lowest density, the exposure is switched off after this necessary minimum time $t_{min}$. In the case of microfilms having higher densities, exposure takes place for a longer time that $t_{min}$, depending upon the degree of density.

The light-sensitive measuring unit is moved above the light-sensitive recording material only at a very short distance, because at the level of the light-sensitive recording material the imaged image of the microfilm is exact and becomes less exact with increasing distance from this level, and thus unsuitable for a density measurement. Therefore it is advantageous to arrange the carriage in such a manner that it moves as closely as possible above the recording material. In order to avoid the loss in clearness, which occurs even at a small distance, the light-sensitive measuring unit may be arranged on the carriage or carrier in such a manner that the light rays do not strike it directly, but only after being reflected by a mirror which is also arranged on the carriage or carrier. The distance between the mirror and the light-sensitive measuring unit is exactly the same as the distance between the mirror and the light-sensitive recording material.

On the carriage or carrier a system of lenses also may be arranged, which produces an enlarged image on the light-sensitive measuring unit. A system of lenses is needed if the light-sensitive measuring unit is larger than the smallest image area of the microfilm which gives one signal for the control of the exposure. Without a system of lenses which enlarges the image area in such a manner that it fills in the light-sensitive measuring unit, not only the light of the smallest spot of the microfilm suitable for the ascertainment of the density would fall on the light-sensitive measuring unit, but also and at the same time light of the parts of the microfilm surrounding this spot, so that signals falsifying the density would be measured. A discriminator is provided for selecting that signal of the light-sensitive measuring unit which corresponds to the highest or lowest density of the microfilm. For example, a condenser may be used as a discriminator and also may serve as a storage device for the signal measured. As mentioned above, a difference or quotient former may be arranged in front of the discriminator, if the signal of the highest density is to be selected. Thus, the discriminator again can select the highest signal.

The signal selected by the discriminator is passed on to a device which controls the exposure time on the basis of this signal, i.e. its stops the exposure at the right moment. A sawtooth generator may be used for this purpose. The rate of increase of the voltage of the sawtooth generator as a function of time depends upon the signal coming from the discriminator and reaching the input thereof. The sawtooth generator is started at the end of a predetermined time after the beginning of exposure, a period of time which is shorter than the minimum exposure time needed. The predetermined time is at least as long as the time needed for the movement of the light-sensitive measuring unit above the light-sensitive recording material. Thus it is guaranteed that the density measurement is stopped and that the discriminator actually selects the highest signal of the entire measurement and passes it on. If the sawtooth generator is started earlier, a signal may influence its rate of increase for a certain time at the beginning which is not the highest signal measured. Consequently a false time is obtained.

In a comparator the output voltage of the sawtooth generator is compared with a predetermined voltage, which is adjusted at the calibration of the apparatus in such a manner that correctly exposed reenlargements are obtained. In the case of equal voltages, the comparator gives a signal which either switches off the light source or operates a diaphragm which is moved in front of the light source and covers it.

However, a sawtooth generator also may be used which is started at the beginning of the exposure and the voltage of which increases at the same rate as a function of time. This voltage is passed on to the input of the comparator. The signal coming from the discriminator is given as a comparison voltage to the second input thereof, but only after a predetermined time. This period of time is not longer than the minimum exposure time $t_{min}$ needed, and at least as long as the time necessary for the light-sensitive measuring unit to move above the light-sensitive recording material. In the case of equal voltages the comparator again gives a signal which stops the exposure.

Figure 2:
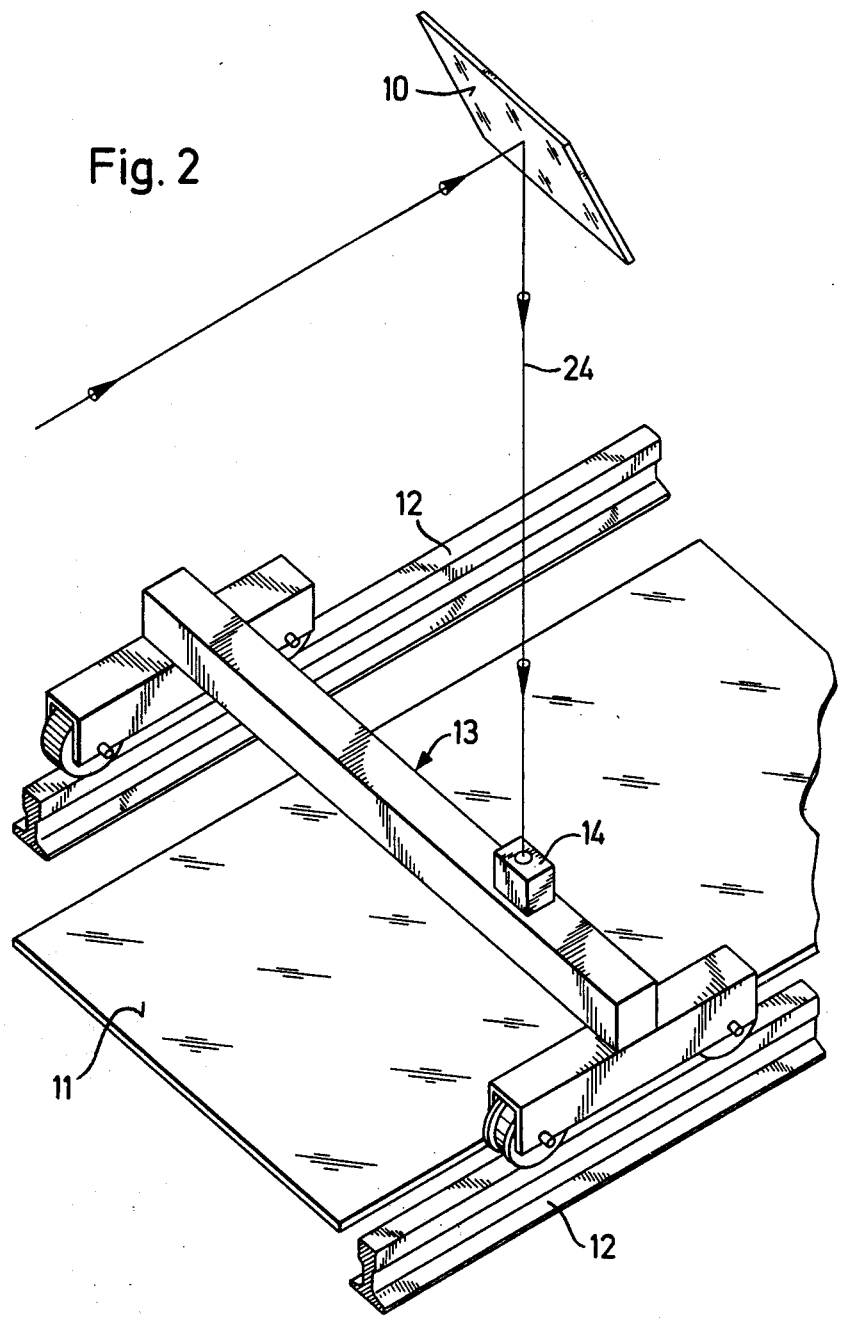
Figure 3:
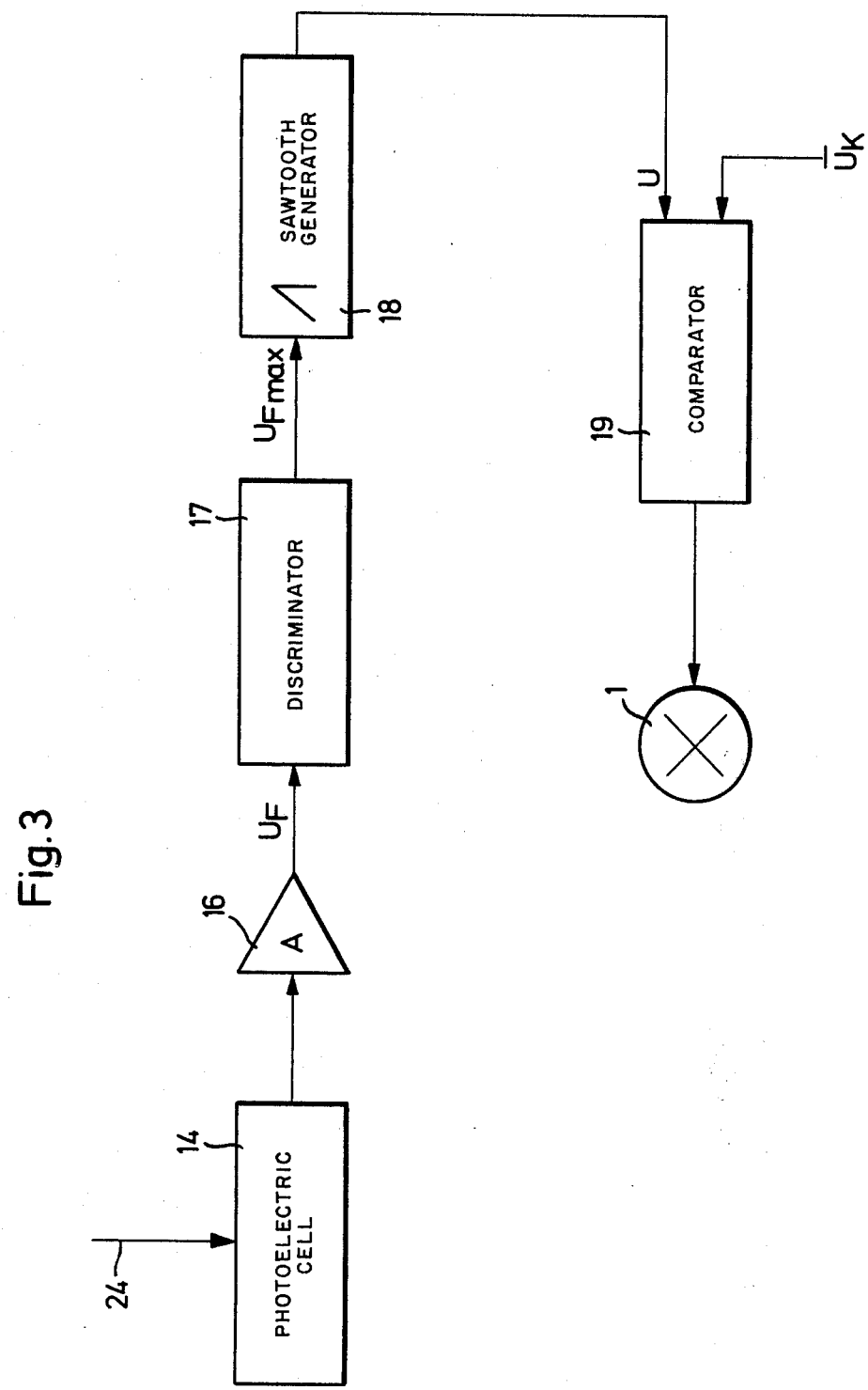
Figure 3A:
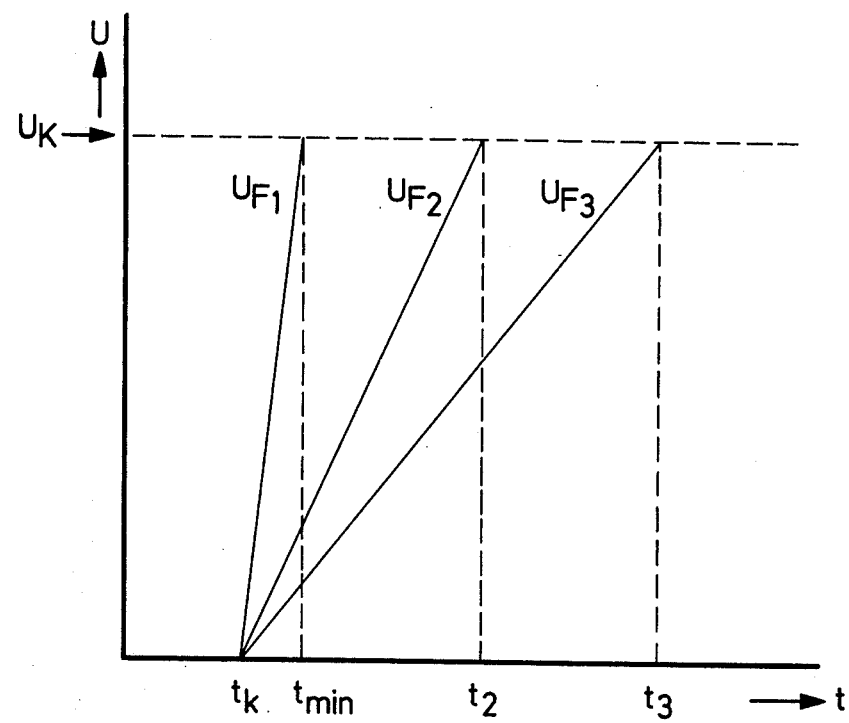
Figure 3B:
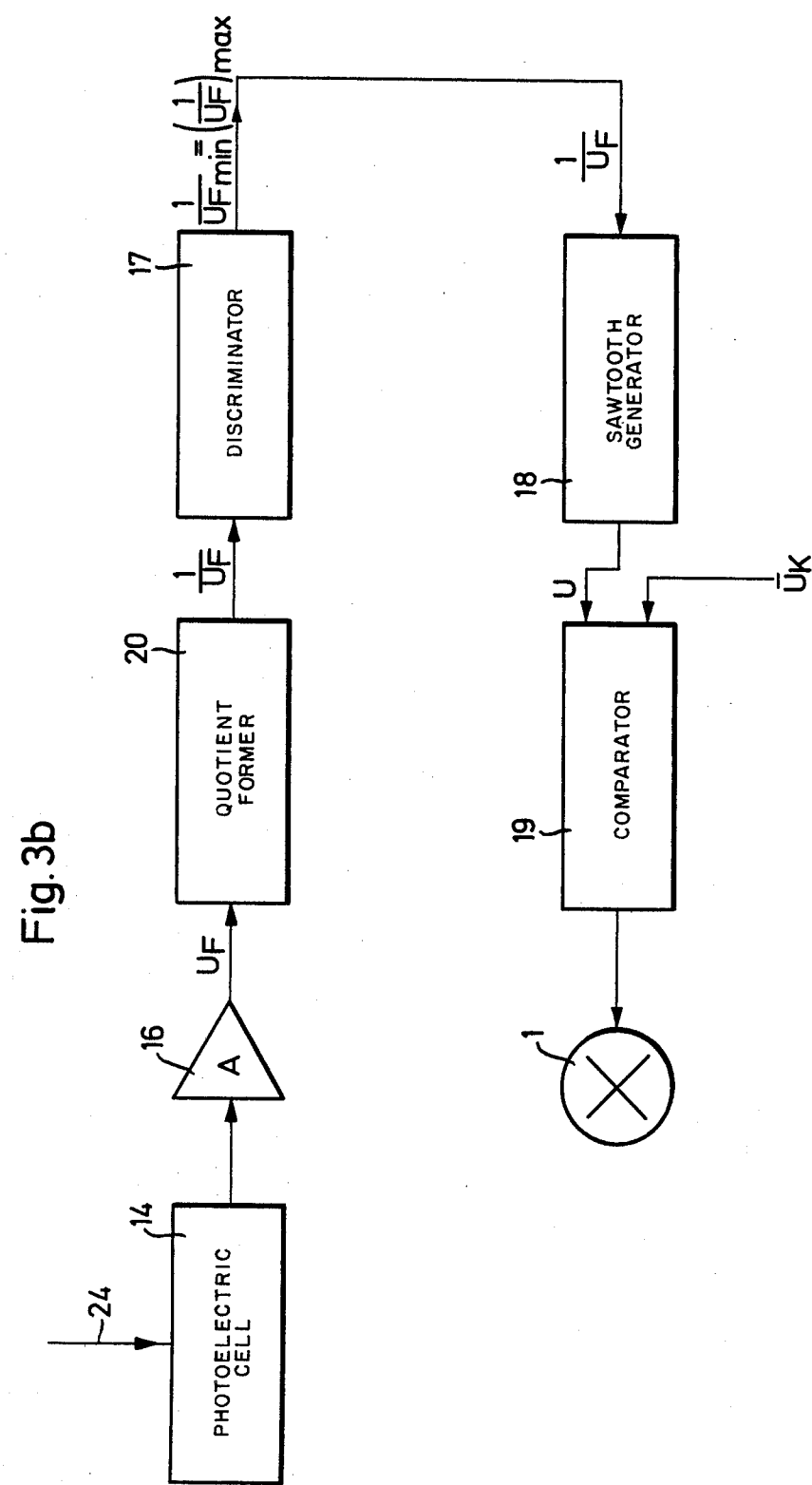
Figure 4:
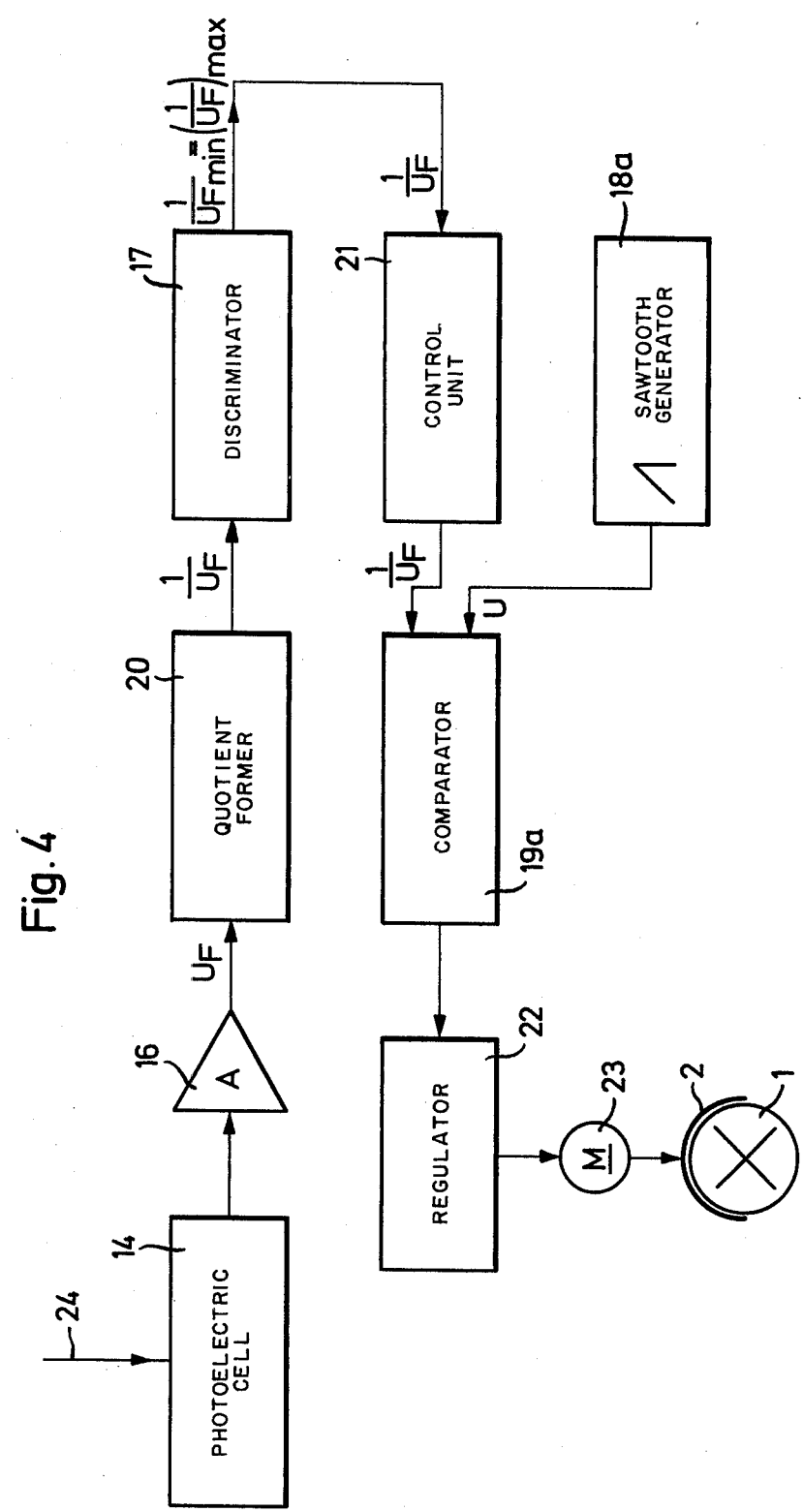
Figure 4A:
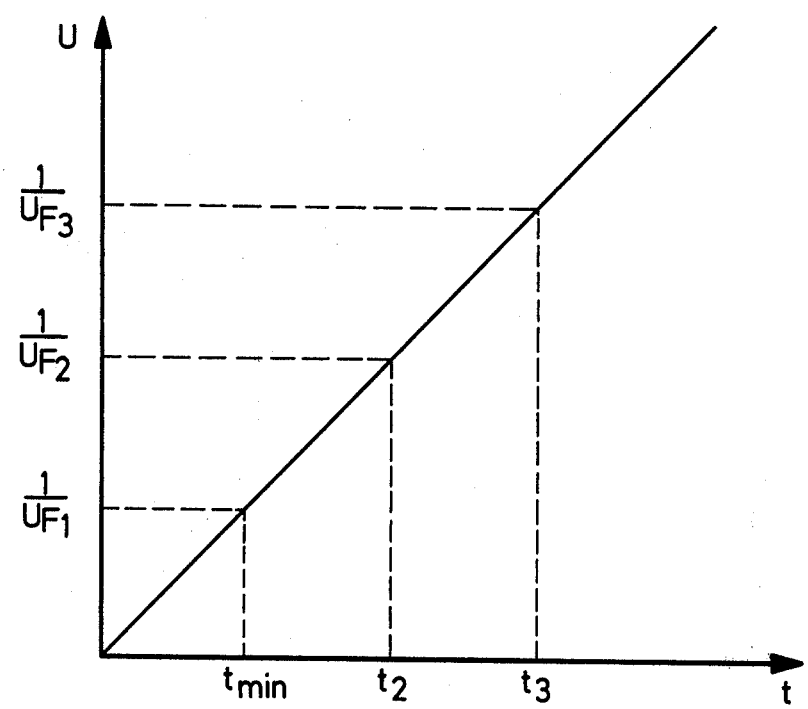

The invention will now be further described by two embodiments in the accompanying drawings, in which FIG. 1 is a schematic cross-section of the ray path in the reenlargement apparatus with deflecting mirror, FIG. 2 is a perspective view of the light-sensitive recording material and the carriage with the light-sensitive measuring unit without deflecting mirror, FIG. 3 is a block diagram of a first embodiment based on the lowest density of the microfilm, FIG. 3a is a diagram which shows the increase in voltage of the sawtooth generator as a function of time in the embodiment of FIG. 3, FIG. 3b is a block diagram of the first embodiment, based on the highest microfilm density, FIG. 4 is a block diagram of a second embodiment, based on the highest microfilm density, FIG. 4a is a diagram which shows the increase in voltage of the sawtooth generator of the embodiment of FIG. 4, and FIG. 4b is the block diagram of a second embodiment, based on the lowest microfilm density.

Referring to FIG. 1, 1 is the light source. A diaphragm 2 can be moved in front of the light source 1 in the direction indicated by the arrow in order to stop the exposure. In the ray path, the system of lenses is shown schematically by means of the condensor lens 3. The microfilm 4, e.g. a microfilm card, is introduced, for the purpose of exposure, between the glass plates 5 and 6, between which it occupies a planar position during exposure. On a disc 7 there are arranged several objectives 8 and 9, which can be brought into the ray path alternately by turning the disc. The light is deflected by the mirror 10 in the direction of the light-sensitive recording material 11. Along the longitudinal sides of the recording material 11 there are provided guide rails 12 for the carriage 13 on which it is moved above the recording material 11. The photoelectric cell 14 is arranged on the carriage 13 in such a manner that only the light reflected by the mirror 15, which is also arranged on the carriage, strikes it. The distance A between the mirror 15 and the photoelectric cell 14 is the same as the distance B between the mirror 15 and the light-sensitive recording material 11.

FIG. 2 is a perspective view of the carriage 13 and the light-sensitive recording material 11. In this embodiment, no mirror 15 is provided on the carriage 13. The light reflected by the mirror 10 directly strikes the photoelectric cell 14 when the cell is moved above the recording material 11 by means of the carriage 13.

In the block diagram of FIG. 3 the arrow 24 indicates the light coming from the microfilm 4 and striking the photoelectric cell 14. The signals measured by the photoelectric cell 14 during its movement above the recording material are amplified in the amplifier 16 and passed on to the discriminator 17. The discriminator selects from the signals the one which corresponds to the brightest spot of the microfilm 4, i.e. the highest photoelectric voltage $U_{Fmax}$ (see also FIG. 4b) delivered by the photoelectric cell 14. The discriminator then passes this signal $U_{Fmax}$ on to the sawtooth generator 18. This generator is started after a predetermined time $t_k$ after the beginning of the exposure (see FIG. 3a), which time is shorter than the minimum exposure time $t_{min}$ needed, but sufficiently long that the movement of the photoelectric cell 14 above the recording material 11, i.e. the density measurement, is completed within it. The sawtooth generator 18 produces a voltage U, the increase in voltage as a function of time depending on the signal $U_F$ which comes from the discriminator 17. If the density of the bright imaged parts of the microfilm 4 is low and thus the photoelectric voltage $U_F$ high, the rate of increase is high. The voltage U produced by the sawtooth generator 18 increases rapidly with the time, so that the voltage quickly reaches the predetermined voltage value $\overline{U}_K$, which is present at one input of the comparator 19. At the second input of the comparator 19 there is the voltage U produced by the sawtooth generator 18. In the case of equal voltages, the comparator 19 emits a signal by means of which the light source 1 is switched off and the exposure is stopped.

FIG. 3a shows the increase in voltage of the sawtooth generator 18 with different photoelectric voltages $U_{F1}$, $U_{F2}$, $U_{F3}$ coming from the discriminator 17. If a microfilm 4 has the lowest density present and thus the highest photoelectric voltage $U_{F1}$, exposure is switched off after the minimum time $t_{min}$ needed. If the photoelectric voltage is lower, e.g. $U_{F2}$, the voltage U of the sawtooth generator 18 increases accordingly, i.e. more slowly, and reaches the predetermined voltage $\overline{U}_K$ only after the time $t_2$. The corresponding facts apply to the still lower photoelectric voltage $U_{F3}$ and the time 3, which is longer accordingly. As mentioned above, the sawtooth generator 18 is started only at the end of the predetermined time $t_k$ which begins with the beginning of the exposure. This may be achieved by, for example, a time control unit (not shown).

In FIG. 4 a second embodiment is shown. In this case the signal $U_F$ of the photoelectric cell 14 is selected, which corresponds to the highest density of the microfilm 4, i.e. the lowest photoelectric voltage $U_F$ is used for controlling the exposure (see also FIG. 3b). Of the signals $U_F$ coming from the photoelectric cell 14, the quotient $1/U_F$ is formed in the quotient former 20, so that again the highest signal $1/U_F$ is selected in the discriminator 17. At the end of the predetermined time $t_k$, this signal is passed on to the comparator 19a via the time control unit 21. At the beginning of exposure, the sawtooth generator is started and produces a voltage U which increases as a function of time independently of the signal $1/U_F$, i.e. always at the same rate. In contrast to the embodiment of FIG. 3 the sawtooth voltage is in this case not compared with a predetermined voltage, but with the reciprocal photoelectric voltage $1/U_F$ coming from the discriminator 17 and corresponding to the density of the microfilm 4 to be exposed (see FIG. 4a). If the nonimaged parts of the microfilm have a low density, i.e. if the photoelectric voltage $U_F$ is relatively high and the reciprocal value $1/U_F$ relatively low, for example $1/U_{F1}$, the comparison voltage at the comparator 19a is low. The sawtooth voltage U increasing constantly with the time will thus reach the voltage value $1/U_{F1}$ already after a short time, e.g. $t_{min}$. The comparator 19a will thus soon produce a signal which is passed via a regulator 22 on to a control motor 23 which moves the diaphragm 2 in front of the light source 1 and thus stops the exposure. In the case of higher densities and thus lower photoelectric voltages, e.g. $U_{F2}$, the reciprocal value $1/U_{F2}$ is higher accordingly. It then will take a longer time ($t_2$) until the sawtooth generator 18a has reached the voltage $1/U_{F2}$ and the comparator 19a passes on the signal for closing the diaphragm 2. The corresponding facts apply to the signal $1/U_{F3}$, which is produced by the sawtooth generator 18a only after the time $t_3$.

It will be obvious to those skilled in the art that many modifications may be made within the scope of the present invention without departing from the spirit thereof, and the invention includes all such modifications.

What is claimed is:

1. A method of controlling the exposure time in apparatuses for the re-enlargement of a microfilm in which the density of the microfilm is ascertained during exposure and the exposure time is controlled in accordance with the ascertained density, which comprises guiding a light-sensitive measuring unit, during a minimum exposure time needed and at a short distance above a light-sensitive recording material, and simultaneously measuring the density of the microfilm with the light-sensitive measuring unit, the signals measured by the light-sensitive measuring unit, which correspond to the areas of the microfilm having the maximum or minimum density, determining the exposure time.

2. An apparatus for controlling the exposure time in apparatuses for the re-enlargement of a microfilm having at least one light-sensitive measuring unit, comprising a movable measuring unit means for ascertaining the density of the microfilm during exposure, said means being arranged in a ray path between the microfilm and a light-sensitive recording material, discriminator means which selects the measured signals of the light-sensitive measuring unit means, corresponding to an extreme value of the density of the microfilm, and means for controlling the exposure time according to the signal coming from the discriminator means.

3. An apparatus according to claim 2 in which the light-sensitive measuring unit means is mounted on carriage means movable above the recording material during the minimum exposure time needed.

4. An apparatus according to claim 2 in which for determining the highest density of the microfilm, a quotient former means is included between an amplifier means which is connected to the light-sensitive measuring unit and the discriminator means.

5. An apparatus according to claim 2 in which the means for controlling the exposure time includes a sawtooth generator means whose increase in voltage as a function of time depends upon the discriminator means signal and whose output voltage is at a comparator means in which it is compared with a predetermined signal and, in the case of equal signals, the output voltage passes a signal to the comparator means output which switches off a light source or closes a diaphragm.

6. An apparatus according to claim 2 in which the means for controlling the exposure time includes a sawtooth generator means whose increase in voltage as a function of time is constant and whose output voltage is at a comparator means in which it is compared with the signal coming from the discriminator means and, in the case of equal signals, the output voltage passes a signal to the output of the comparator means which terminates exposure.

* * * * *